United States Patent [19]

Sommeria

[11] 4,321,684

[45] Mar. 23, 1982

[54] DIGITAL RESOLVER

[75] Inventor: Marcel R. Sommeria, Palos Heights, Ill.

[73] Assignee: Theleme Corporation, Palos Heights, Ill.

[21] Appl. No.: 57,590

[22] Filed: Jul. 16, 1979

[51] Int. Cl.[3] .......................... G06J 1/00; G05B 1/01

[52] U.S. Cl. .............................. 364/602; 235/92 MP; 318/661; 340/347 SY; 364/603; 364/730

[58] Field of Search .............. 364/602, 769, 571, 730, 364/603; 340/146.2, 347 SY; 235/92 MP, 92 PS; 318/569, 652, 661

[56] References Cited

U.S. PATENT DOCUMENTS

| | | | |
|---|---|---|---|
| 3,078,400 | 2/1963 | Kilroy et al. | 340/347 SY |
| 3,183,421 | 5/1965 | Herchenroeder | 235/92 MP |
| 3,676,650 | 7/1972 | Henegar | 340/347 SY |
| 4,079,374 | 3/1978 | Cox, Jr. | 340/347 SY |
| 4,134,106 | 1/1979 | Hungerford | 235/92 MP |

*Primary Examiner*—Errol A. Krass

*Attorney, Agent, or Firm*—Hill, Van Santen, Steadman, Chiara & Simpson

[57] ABSTRACT

A digital resolver incorporates an adder for periodically and repetitively calculating the sum of two operands, one of which is increasing and the other decreasing at a rate determined by the excitation frequency of a resolver. The phase of the one of the operands is responsive to the angular position of the resolver rotor, while the phase of the other operand is responsive to forward and reverse command pulses. The sum produced by the adder is zero when the resolver assumes its commanded position, and at other times identifies the magnitude and direction of the resolver error. A digital-to-analog converter is provided for converting the error signal to an analog voltage.

13 Claims, 4 Drawing Figures

FIG. 1
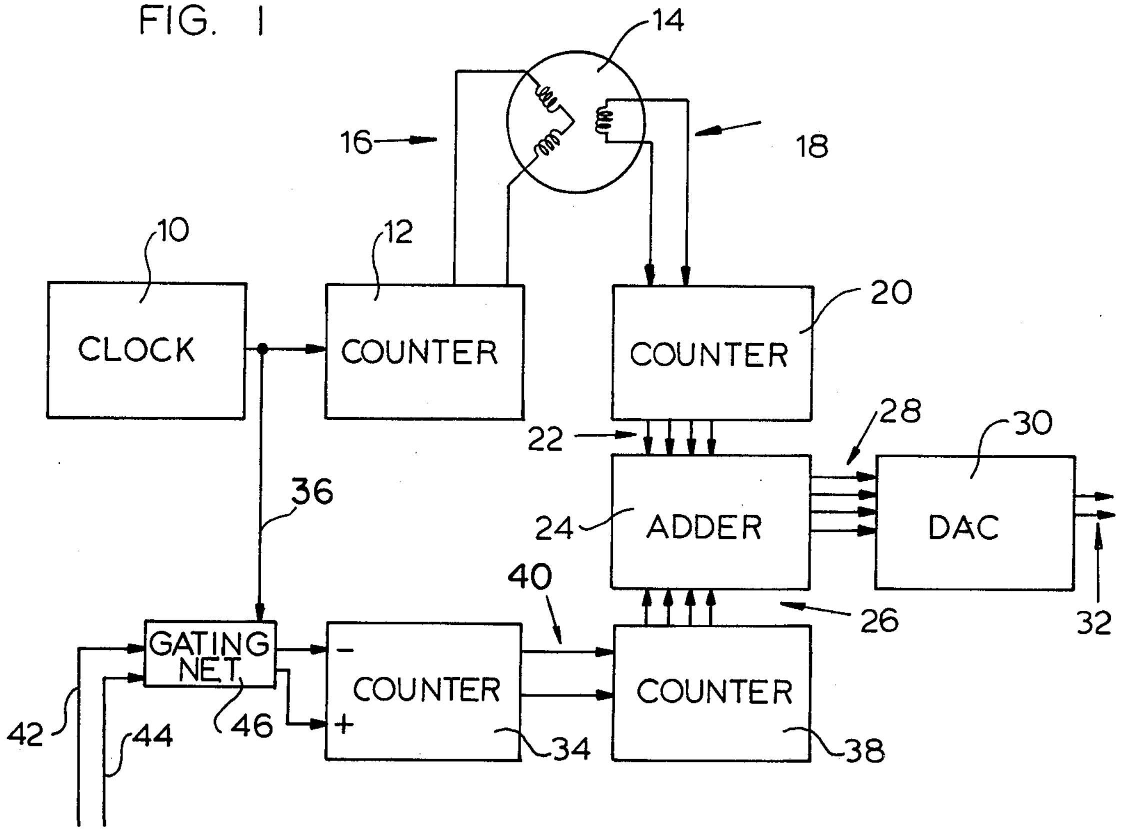
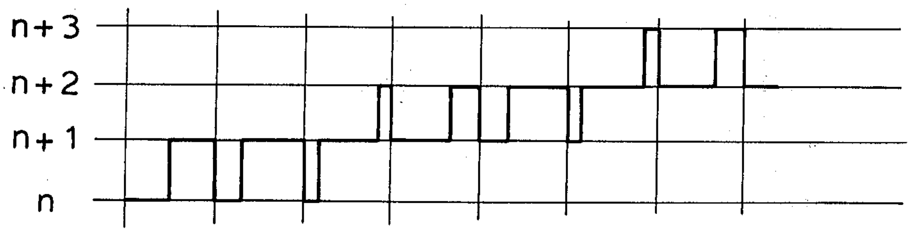
FIG. 4
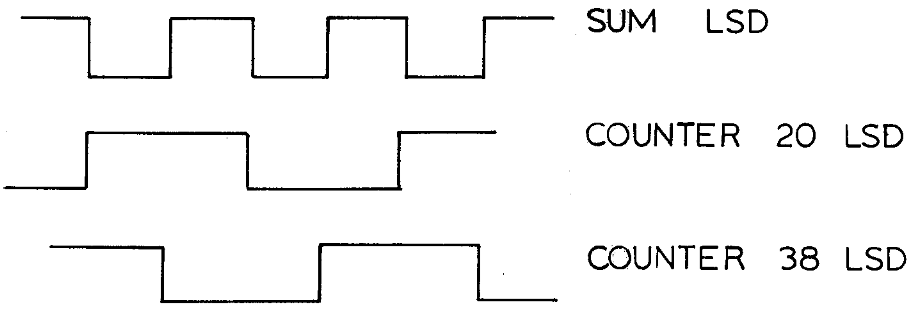
FIG. 3

DIGITAL RESOLVER

BACKGROUND

1. Field of the Invention

The present invention relates to resolver systems, and more particularly to a system incorporating a resolver equipped with means for identifying an error between the commanded and actual positions of a resolver rotor.

2. The Prior Art

Resolvers have long been used as transducers for generating signals representative of the relative position of a mechanical member attached to the resolver rotor. Various means have been devised for generating a digital signal in response to the position of the resolver, but such systems have suffered from one or more drawbacks. In particular, it has not been possible to provide a digital resolver system which is both simple and inexpensive, and also highly accurate and capable of providing a smooth output signal for controlling a servo or the like.

SUMMARY OF THE PRESENT INVENTION

It is a principal object of the present invention to provide a digital resolver which is simple and inexpensive, and which is also highly accurate and capable of furnishing a smooth output signal.

In one embodiment of the present invention, there is provided means for producing a digital operand which cycles through a range of digital values, the value being represented at any given time being cyclically controlled in response to the excitation signal of the resolver. A second operand is provided cycling through a range of values in the opposite direction, with a phase dependent on the desired position of the resolver rotor. An adder is connected to receive both operands and to produce a signal representative of the sum thereof, which sum may be used as the error signal representing the magnitude and direction of the difference between the commanded position of the resolver and its actual position.

A resolver system incorporating the present invention is simple and inexpensive, and is also highly accurate. It has an effective sampling rate which is twice the resolver excitation frequency, which is easily filtered to provide a smooth output signal.

These and other objects and advantages of the present invention will become manifest by an examination of the following description and the accompanying drawings.

BRIEF DESCRIPTION OF THE DRAWINGS

Reference will now be made to the accompanying drawings, in which:

FIG. 1 is a functional block diagram of an illustrative embodiment of the present invention;

FIG. 3 illustrates certain waveforms which are produced during operation of the apparatus; and FIG. 4 illustrates the analog output during one part of an operation.

DESCRIPTION OF THE PREFERRED EMBODIMENT

Figure 2:
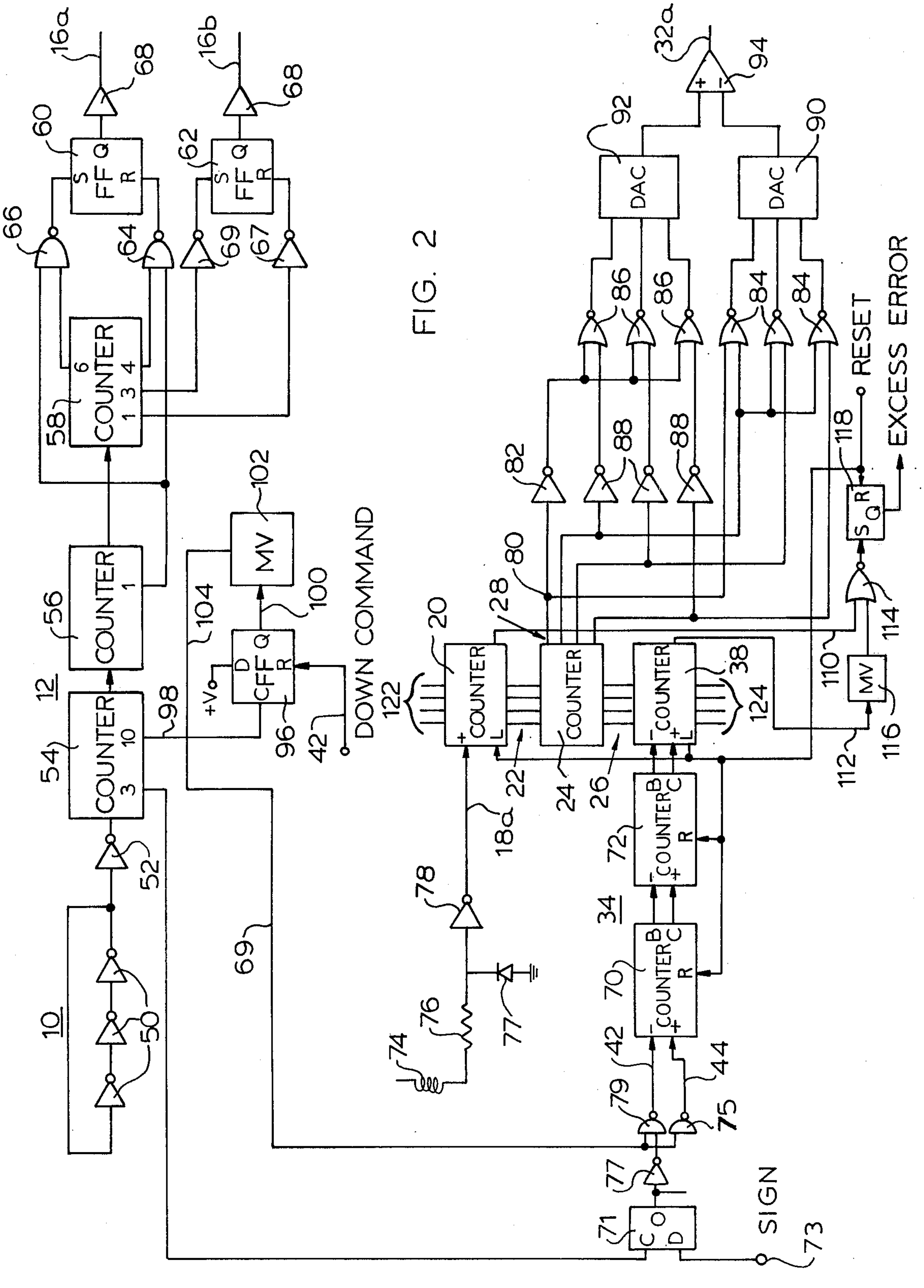
FIG. 2 is a more complete functional block diagram of the apparatus of FIG. 1.

Referring now to FIG. 1, the main components of an illustrative embodiment of the present invention are illustrated. A clock generator oscillator 10 provides a clock signal consisting of a train of pulses at an appropriate frequency, which pulses are supplied to a counter 12. The counter 12 continuously counts the clock pulses and provides an excitation signal to the primary of a resolver 14, over lines 16. The output of the resolver 14 is developed on lines 18 and is supplied to the input of a binary counter 20. The phase of the pulses on the line 18, relative to the phase of the excitation signal on the line 16, is a function of the angular position of the rotor of the resolver, such that for each rotation of the rotor, the phase is advanced or retarded by one cycle. During periods of rotation of the rotor of the resolver, the frequency of the pulse train on the lines 18 is different from that of the pulses on the line 16, according to the difference in the rate of change of phase of the signals on these lines.

The output of the counter 20 is a digital operand made available on a plurality of parallel lines 22, one for each stage of the counter. The operand is furnished to one operand input of an adder 24, which continuously calculates the sum of the operand on the lines 22, and a second operand furnished on a plurality of lines 26. A digital representation of the sum is produced on a plurality of output lines 28, which are connected to a digital-to-analog converter (or DAC) 30. The output of the DAC is made available on lines 32.

A second counter 34 is provided which normally counts down in response to clock pulses provided by the clock generator 10 over a line 36. Its overflow output (normally constituting a "borrow" pulse) is conveyed to a binary counter 38 over one of the pair of output lines 40, and the counter 38 is counted down by such pulses. The lines 26 are connected to the outputs of the several stages of the counter 38, so that the second operand present on the lines 26 corresponds to the content of the counter 38 at any given time.

As the pulses from the clock source 10 are effective to raise the operand on the lines 22 and simultaneously lower the operand on the lines 26, the output of the adder 24 on the lines 28 is normally constant, even though the operands are changing. The sum is normally zero when the rotor of the resolver 14 is positioned as required by command pulses, and when the sum is not zero, the analog signal developed on the lines 32 is typically used to control a servo or the like to position the rotor of the resolver 14 so that the sum becomes zero. The incremental changes in the outputs of the counters 20 and 38 are staggered, so that the least significant bit of the sum typically alternates between "zero" and "one" significance at twice the clock frequency. This is a relatively high frequency, compared to the typical rate of change in the sum, and is easily filtered out.

Motion of the movable member mechanically connected to the rotor of the resolver 14, may be influenced by modification of the state of the counter 34. This is accomplished by providing forward and reverse command pulses to the up and down count inputs of the counter 34 over lines 42 and 44, respectively. When reverse motion is desired, pulses are supplied over the line 44 to the up-counting input of the counter 34, and if command pulses cause the counter 34 to overflow, a "carry" pulse (rather than a "borrow" pulse) is conveyed over one of the lines 40 to the up-counting input of the counter 38. This shifts the phase of the operand represented by the counter 38 by one unit, which brings about a one unit change in position of the rotor of the resolver 14 by the mechanism described above.

When forward command pulses are provided on the lines 42, they are supplied to the down-counting input of the counter 34 through a gating network 46 which operates to intersperse them with the clock pulses provided on the line 36. The result is that the counter 34 is counted down more rapidly, to shift the phase of the operand, represented at the outputs of the counter 38, in the reserve direction.

It is apparent that the counters 34 and 38 are both up-down counters, while the counters 12 and 20 may be more simple up counters, since downward counting is not required. The radix of the counters 12 and 34 determine the number of parts into which one revolution of the resolver 14 may be divided, and the radix of the counters 20 and 38 determine the number of cycles of following error which may be accommodated with no loss of synchronism between the command pulses and the angular position of the resolver. In one embodiment, the radix of the counters 12 and 34 is 100 and that of the counters 20 and 38 is 16, but other values may be used if desired.

The apparatus of FIG. 1 represents an extremely simple and accurate digital resolver, which is able to maintain an output representative of the magnitude and direction of an error signal over a relatively large range, corresponding to the radix of the counters 20 and 38.

Preferably, the null position is indicated by zero output from the adder 24, and when the output differs from zero in either a positive or negative direction, this is identified by a change in the analog voltage on the output line 32 which is greater or less than a predetermined value. When the nominal value on the output lines 32 is zero, a plus output voltage represents an error signal of one direction, while a negative signal represents an error in the opposite direction. The magnitude of the output voltage corresponds to the magnitude of the error.

Referring now to FIG. 2, a more detailed functional block diagram of the apparatus of FIG. 1 is illustrated. The oscillator 10 comprises three inverters 50 connected in a serial loop, with the outputs of one of the inverters connected through a buffer 52 to the counting input of the counter 12, comprising a pair of digital counter units 54 and 56 connected in cascade.

The counter units 54 and 56 each have a radix of 10, combining to form a radix of 100. Outputs corresponding to a plurality of decimal states are available at various terminals or pins of the counter units.

The overflow or carry output of the counting unit 56 is connected to the counting input of a further decimal counter unit 58, which is used to develop a two-phase signal at the frequency of the overflow pulses produced by the counting unit 56, for energization of the resolver. For this purpose, a pair of flip-flops 60 and 62 are employed which have their set and reset inputs connected by appropriate logic to outputs of the counting units 56 and 58.

The set input of the flip-flop 60 is connected to the output of a NAND-gate 64, the inputs of which are connected to the pin 1 output of the counter unit 56 and to the pin 4 output of the counter unit 58. These outputs both go high when the counter units 56 and 58 are in their "25" state, i.e., the counter unit 58 stores a 2 and the counter unit 56 stores a 5. The set input of the flip-flop 62 is connected directly to pin 1 of the counter unit 58, which goes high when the counter units referred to are in their "50" state. The reset input of the flip-flop 60 is connected through an inverter 67 to the output of a NAND-gate 66, the inputs of which are connected respectively to pin 1 of counter unit 56 and pin 6 of counter unit 58, both of which are high when the counter units are in their "75" state. The reset input of the flip-flop 62 is connected through an inverter 68 from the pin 3 output of the counter unit 58, which goes high when the counter units are in their "0" state. It is apparent that, with the connections described, the flip-flops 60 and 62 generate a two-phase square wave signal.

A suitable buffer amplifier 68 is connected to the Q output of the flip-flop 60, and its output is connected to a line 16*a*. A similar buffer amplifier 68 is connected to the Q output of the flip-flop 62, and its output is connected to a line 16*b*. The lines 16*a* and 16*b* are connected to the two primary windings of a resolver 14 and supply the two-phase signal to the resolver.

The secondary of the resolver, illustrated as a coil 74, is connected through a resistor 76 to the input of an inverter 78, the output of which is connected over line 18*a* to the input of the counter 20. A clamping diode 77 is connected at the input of the inverter 78 to limit negative-going signals at this point. The output of the inverter 78 is connected to the input of the counter 20 via line 18*a*.

Pin 4 (or the Q2 output) of the counter unit 54 is connected over a line 69 to the clock input of a D-type flip-flop 71, which has its data input connected to a terminal 73. The Q output of the flip-flop 71 is connected directly to one input of a NAND-gate 75, and through an inverter 77 to one input of another NAND-gate 79. The gates 75 and 79 are connected respectively to the up and down counting inputs of the counter 34, consisting of decimal counting units 70 and 72. The counting units 70 and 72 are both up-down counters, having separate inputs for up-counting, and the line 69 is connected to the down-counting input of the counting unit 70. The carry and borrow outputs of the counting units 70 are connected to the up-counting and down-counting inputs of the units 72, in cascade fashion. In similar fashion, the outputs of the counting unit 72 are connected to the up and down counting inputs of the up-down binary counter 38.

The other inputs of the gates 75 and 77 come from a one shot multivibrator 102, as described hereinafter, which supplies the counting pulses.

The counters 20 and 38 are both four-stage binary counters, so that the digital outputs represented on the lines 22 and 26 represent a binary coded value of the current state of the respective counters. They are supplied to the operand inputs of the adder unit 24, which produces a digital representation of the sum on output lines 28.

The four output lines 28 correspond to the binary orders 1, 2, 4 and 8 of the sum. The order 8 signal is taken as the sign of the sum, and is connected over a line 80 to one input of each of three NOR-gates 84. The other input of each of the NOR-gates 84 is connected respectively to the 1, 2 and 4 order outputs, via lines 28. When the sign signal on the line 80 is low, the NOR-gates 84 are effective to pass and invert the signals on the 1, 2 and 4 outputs.

The line 80 is connected through an inverter 82 to one input or another group of three NOR-gates 86. The other input of each of the NOR-gates 86 is connected through an inverter 88 to one of the 1, 2 and 4 output lines 28. When the signal on the line 80 is high, the NOR-gate 86 are affected to pass the double inverted or true outputs of the 1, 2 and 4 order output lines 28.

The outputs of the NOR-gates 84 are connected to inputs of a DAC 90, and the outputs of the NOR-gates 86 are connected to inputs of a similar DAC 92. The outputs of the two DAC's are connected to inputs of a differential amplifier 94, which provides, on an output line 32*a*, an analog representation of the sum represented by signals on the lines 28. A "zero" reference voltage is produced on the line 38 when the sum on the lines 28 is binary zero, with either sign on the line 80. If the sum is not zero, one of the DAC's 90 and 92 is effective to produce a different output voltage while the other is held at its zero-representing output, and the differential amplifier 94 passes the output of the DAC 92 directly, while inverting that of the DAC 90, so that the two DAC's produce voltages on the line 32*a* which are above and below the reference voltage. Preferably, the amplifier 94 has unity gain.

Forward command pulses are introduced over the line 44 to the up-counting input of the counting unit 70, while reverse commands are connected to the down-counting input 42. The data input of a flip-flop 96 is connected to an operating voltage, and the set input of the flip-flop is connected by a line 98 to pin 10 of the counter unit 54 (the Q4 output).

The Q output of the flip-flop 96 is connected over a line 100 to the trigger input of a monostable multivibrator 102, which generates a short pulse on a line 104, synchronized with the signal on the line 98. The line 104 is connected to a second input of each of the gates 75 and 77, so they are effective to pass, to the counting inputs of the counter unit 70, pulses on the line 104.

The accuracy of the digital resolver illustrated in FIGS. 1 and 2 is extremely high, being limited only by the radix chosen for the counters 12, 20, 34 and 38, which may be made as large as desired. System performance is not degraded because of the counters 20 and 38, as in some prior art systems. The adder unit 24 is selected to accommodate the binary operands corresponding to the number of orders of the counters 20 and 38. When these counters have only four binary stages, as shown in the embodiment of FIG. 2, the apparatus is extremely inexpensive and may be readily fabricated with a few integrated circuit chips of types which are readily available on the market. Any of a plurality of logic family units may be employed such as TTL, Schottke, LS, CMOS, or others. When CMOS logic is used, the counter units 54, 56 and 58 may conveniently by Type 4017, and the flip-flops 60, 62 and 96 may be Type 74C74. The multivibrator 102 may conveniently be a 74C221. The counter units 70 and 72 may both be Type 74C192, and the counters 20 and 38 may conveniently be Type 74C193, although a simpler binary counter may be used for the counter 20, since it does not need to be counted downwardly.

Changes in the state of the counters 34 and 38 are interleaved with changes in state of the counters 12 and 20. Thus the least significant bits of the two operands supplied to the adder 24 also change state alternately, giving rise to the waveforms illustrated in FIG. 3. The least significant bit of the sum alternates at twice the frequency of the least significant operand bits, which is easily filtered to yield a smooth analog output voltage.

It will be observed that there is no sudden transition of the output of the apparatus as the result of a change in sign when the sum output passes through zero, because the highest order sum output is taken as a sign indication and a negative sign results in the inversion of all other outputs.

The counter has its carry output connected by a line 110 to one input of an OR-gate 114, and the borrow output of the counter 38 is connected through a pulse stretching one shot multivibrator 116 to the other input of the OR-gate 114. Normally, the carry and borrow pulses (which are short low-going pulses) occur separately, and so the OR-gate maintains a high output at all times. When the sum of the states of the counters 20 and 38 is either zero or fifteen, however, the carry and borrow pulses overlap and the output of the OR-gate 114 goes low. This is connected to the set input of a flip-flop 118, the Q output of which produces a signal indicative of excess error in the system. This signal may trigger an alarm or the like. A reset input 120 is connected to the reset input of the flip-flop 118, as well as to the reset inputs of the counters units 70 and 72, and to the load inputs of the counters 20 and 38. The data inputs 122 of the counter 20 are connected to high and low voltage sources so as to set the content of the counter 20 equal to "three" when a reset signal appears, while the data inputs 124 of the counter 38 cause it to be set to "four". The sum is then "seven," which is the no error, or zero condition.

Referring to FIG. 4, the analog output is shown as an example. As the sum output of the adder 24 increases, it does so on a duty cycle basis. For example, as shown in FIG. 4, the first part of the analog output alternates between n and n+1. Proportionately more time each cycle is devoted to the n+1 output, until the n+1 output takes up the whole cycle interval, after which the sum alternates between n+1 and n+2, also on a duty cycle basis. It is apparent that the duty cycle alternation of the analog output between two successive values facilitates smoothing the signal, to give a very smooth result with a minimum of filtering apparatus.

It will be apparent that various additions and modifications may be made in the apparatus of the present invention without departing from the essential features of novelty thereof, which are intended to be defined and secured by the appending claims.

What is claimed is:

1. Apparatus for producing an output signal representative of a difference between two values identifying an actual position of a movable member and a programmed position for said member, comprising, in combination, clock generator means for generating a continuous clock signal, independent of movement of said movable member, means connected to said clock generator means and responsive to movement of said movable member for generating a first digital operand, a source of command pulses for programmed movement of said movable member, means connected to said clock generator means and to said command pulse source for generating a second digital operand, and combining means for arithmetically combining said operands to produce said output signal.

2. Apparatus according to claim 1, wherein said means for generating said first operand comprises a counter connected to count cycles of said clock signal, and means for modifying the phase of the signals counted by said counter in response to movement of said movable member.

3. Apparatus according to claim 2, wherein said means for modifying comprises a resolver having a primary and secondary, means connecting said primary to said clock generator means and means connected said secondary to said counter.

4. Apparatus according to claim 3, including means interposed between said clock generator means and said resolver for generating a two-phase signal in synchronism with said clock signal.

5. Apparatus according to claim 1, wherein said means for generating said second operand comprises a counter connected to count cycles of said clock signal and said command pulses.

6. Apparatus according to claim 5, wherein said counter comprises a bidirectional counter, said counter receiving said clock signal for counting in one direction, and for receiving said command signals for selectively counting in one direction or in the other direction.

7. Apparatus according to claim 6, including gating means for interleaving command pulses which are counted in said one direction with said clock signals.

8. Apparatus according to claim 1, wherein said combining means comprises means for arithmetically adding said operands together to develop said output signal.

9. Apparatus according to claim 1, including logic means connected to said combining means for signaling an excess error condition when the arithmetic combination of said operands is equal to a predetermined value.

10. Apparatus for producing an output signal representative of a difference between two values identifying an actual position of a movable member and a programmed position for said member, comprising, in combination, clock generator means for generating a continuous clock signal, means connected to said clock generator means and responsive to movement of said movable member for generating a first digital operand, a source of command pulses for programmed movement of said movable member, means connected to said clock generator means and to said command pulse source for generating a second digital operand, and combining means for arithmetically combining said operands to produce said output signal wherein said means for generating said first operand comprises a first counter adapted to count cycles of said clock signal in one direction for providing a digital operand which cycles through the radix of said counter, said means for generating said second operand comprises a second counter adapted to count cycles of said clock signal in the opposite direction for providing a digital operand which cycles through the radix of said second counter, said first and second counters having equal radices, whereby the sum of said first and second operands, absent command signals and absent movement of said movable member is a constant value.

11. Apparatus according to claim 10, including means for supplying said clock signal to said first counter and means for supplying an inverted clock signal to said second counter whereby the least significant bits of said first and second operands normally change their states alternately.

12. Apparatus for producing an output signal representative of a difference between two values identifying an actual position of a movable member and a programmed position for said member, comprising, in combination, clock generator means for generating a continuous clock signal, means connected to said clock generator means and responsive to movement of said movable member for generating a first digital operand, a source of command pulses for programmed movement of said movable member, means connected to said clock generator means and to said command pulse source for generating a second digital operand, and combining means for arithmetically combining said operands to produce said output signal wherein said combining means provides a plurality of simultaneous signals on parallel outputs constituting said output signal, and including first and second gate means connected to one of said parallel outputs, and adapted to be operated mutually exclusively thereby, means connecting said first gate means directly to said parallel outputs other than said one output, inverter means connecting said second gate means to said parallel outputs other than said one output, and digital-to-analog converter means connected to the outputs of said first and second gate means for providing an analog signal corresponding to the digital value represented by said parallel outputs.

13. Apparatus according to claim 12, including a separate digital-to-analog converter for each of said first and second gate means, and a differential amplifier connected to said converters, for producing an analog signal which varies above and below a reference voltage in accordance with the significance of said one output.

* * * * *